Patented Nov. 21, 1922.

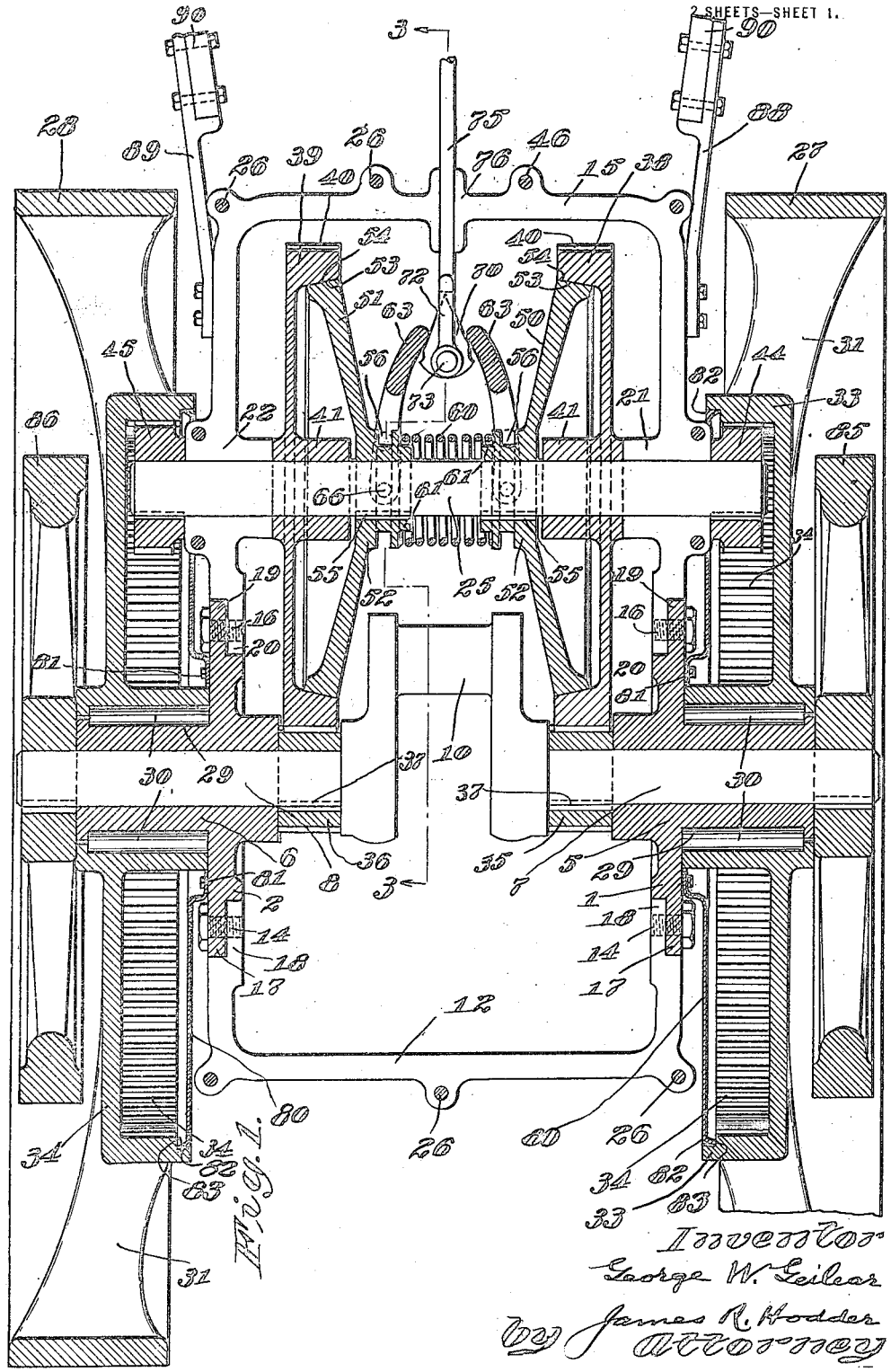

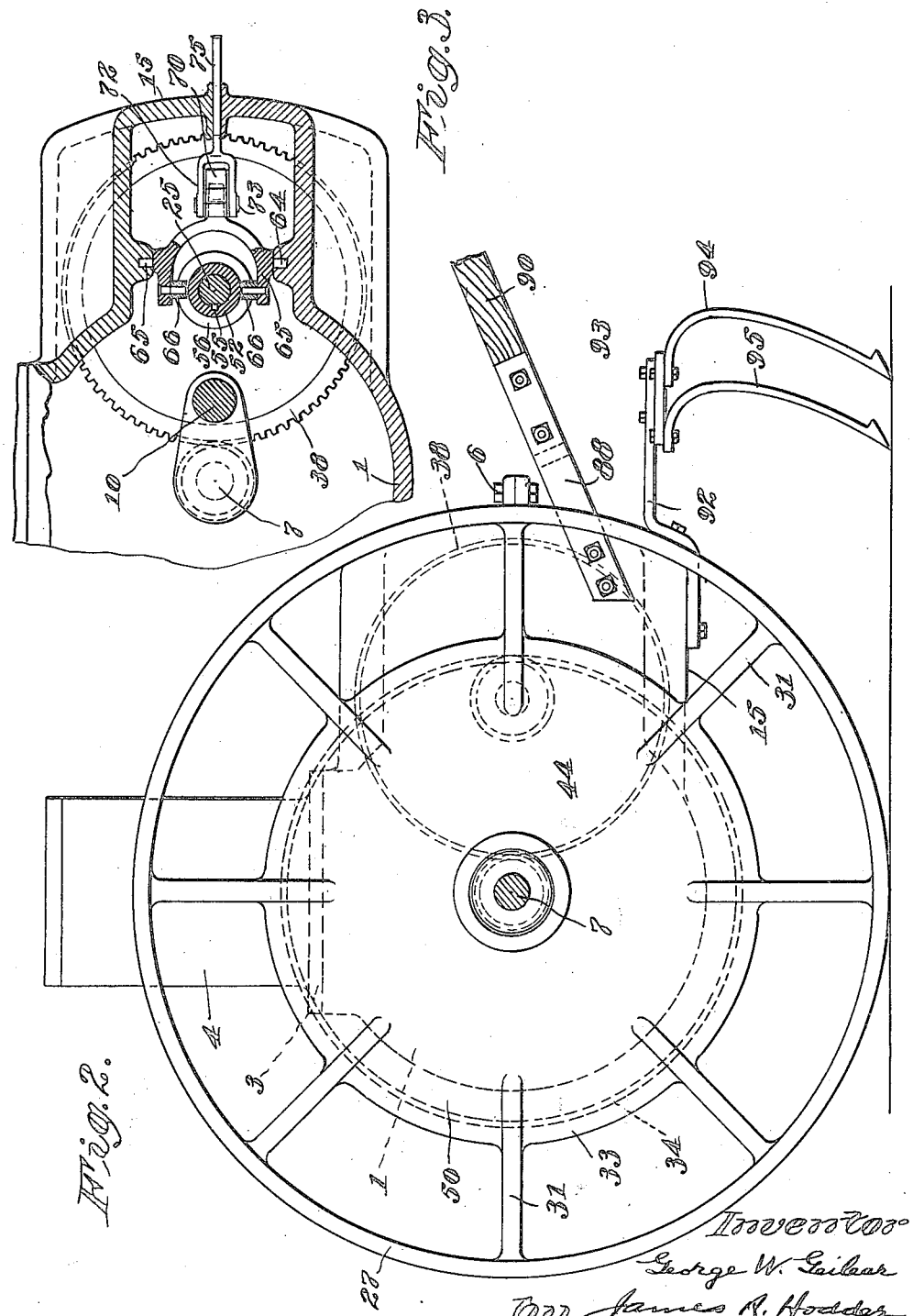

1,436,088

UNITED STATES PATENT OFFICE.

GEORGE W. GEILEAR, OF BROCKTON, MASSACHUSETTS.

TRACTOR.

Application filed March 5, 1920. Serial No. 363,375.

*To all whom it may concern:*

Be it known that I, GEORGE W. GEILEAR, a citizen of the United States, and resident of Brockton, in the county of Plymouth and State of Massachusetts, have invented an Improvement in Tractors, of which the following description, in connection with the accompanying drawings, is a specification, like letters on the drawings representing like parts.

My present invention is an improved tractor and mechanism, together with a novel form of clutch mechanism.

Important objects of the present invention are to provide a compact, efficient, self-propelled tractor vehicle, preferably utilizing two wheels, and comprising a machine of the so-called "Garden tractor type". In this type of tractor machine, the compactness, lightness and efficiency of the entire mechanism are most important, as the machine is intended to be guided and manipulated by hand, the operator walking after the tractor and controlling the speed, direction and operation of the machine from a pair of handles in the rear.

A further object of the present invention is to provide such a tractor machine which will be balanced in its driving mechanism, weights, bearings, etc., and therefore will be most efficient for the power of engine supplied, wearing parts, and ease and efficiency in operation. An additional and most important object of the invention is to provide a novel form of double clutch mechanism adapted to be operated simultaneously and capable of instant actuation from a position remote from the clutch as at the extreme outer end of one of the guiding handles. In order to carry out the balanced relationship of weight and driving mechanism, the novel type of clutch herein shown has been devised, and by utilizing my double clutch mechanism, preferably employing a common spring to operate on both movable clutch members, thus simultaneously seating the same with a uniform tension. Furthermore, my clutch mechanism enables a simultaneous actuation of a plurality of movable clutch members from non-operative into clutching position, without the provision of any bearings or fulcrums other than the clutching instrumentalities themselves, thus simplifying and lightening the construction. I believe that the provision of a simultaneously acting duplex clutch, particularly of the kind described, with an interposed yielding member therebetween, thus acting on the clutch members to afford opposite bearing surfaces, and thereby simultaneously exerting a uniform tension on each clutch, allowing for any inequalities in the respective clutch surfaces and yet securing an "automatic self-seating" as well as uniform spring tension, is distinctly new and I wish to claim the same broadly. The importance of my simultaneous acting clutch is furthermore exemplified in a machine of the tractor type, as illustrated in the drawings, wherein the tractor wheels are normally loosely mounted on opposite ends of the main bearing, through which the crank-shaft of the engine also passes, whereby each tractor wheel must be independently clutched to the driving mechanism or transmission devices to receive power from the engine. My simultaneously acting clutch is therefore of particular importance in maintaining the balanced relation, both of weights, driving strains, and the like, eliminating torsion of the entire mechanism and insuring an even driving strain on all bearings. Further details, novel combinations of parts and important advantages will be hereinafter more fully pointed out and claimed.

Referring to the drawings, illustrating a preferred embodiment of my tractor and clutch, Fig. 1 is a plan view, partly in cross-section, of the mechanism;

Fig. 2 is a side view; and

Fig. 3 is a detailed view on the line 3—3 of Fig. 1.

In the well known garden type of tractor already referred to, such for example as that illustrated in U. S. Patent No. 1,288,888, issued December 24, 1918, it is customary to provide a frame which will constitute diametrically opposite bearings for the crankshaft of the engine and also concentric bearings for each of the tractor wheels, arranged on each side of the engine. The engine cylinder itself, usually mounted vertically over the center of the crankshaft and frame, the transmission mechanism immediately adjacent thereto, and the handle bars extending rearwardly to the position intended for the operator, constitute the fixed parts of the mechanism. Attached also to the transmission case or other fixed part of the frame, are one or more draw bars or the like to which different sets of cultivating implements can be secured, such as cultivator teeth, plowing devices, harrowing or the like members for cultivating the soil.

Referring to the drawings, I provide the main frame or casting consisting in two side plates 1 and 2, united at the top by a cross plate 3 and the engine cylinder 4. These plates have formed integrally thereon hubs 5 and 6 respectively, which hubs constitute the bearings for the crankshaft sections 7 and 8, the same being united with the cranks and arms indicated generally at 10 and positioned midway of the length of said crankshaft. The sides and hub portion may be formed integrally into a forward frame 12 and a rearwardly extending frame 15, or these frames may be detachably united, as clearly shown in Fig. 1, to the sides and hub of the frame by bolts 14, 14, and 16, 16, respectively. Preferably these bolts extend through overlapping and cooperating flanged portions as indicated at 17 and 18 on the forward portion and 19 and 20 on the rear portions. The rear frame 15 is also provided with a pair of diametrically opposite journal bearings 21 and 22, which receives a countershaft 25. These frame portions 12 and 15 are formed cupshaped and in two parts, enclosing the mechanism by bolts 26, 26, 26.

The main hubs 5 and 6 for the crank shaft also constitute the bearings for the tractor wheels 27 and 28, a portion of the outer surface of these hubs being ground smooth to constitute bearings 29 for sets of roller bearings as indicated at 30, 30, on which the wheels 27 and 28 are mounted. These tractor wheels 27 and 28 are formed with relatively broad treads, as usual, and are formed with the spokes 31 radiating from a circular center web 33, which web carries internal gear teeth 34 on its inner surface, through which gears the wheels 27 and 28 are rotated. The engine 4 imparts rotation to the main crankshaft and keyed to the crankshaft sections 7 and 8 are pinions 35 and 36 respectively. Preferably these pinions are adapted to space the crank 10 from the faces of the center webs 5 and 6, being held in position as shown by keys 37, 37. This construction holds the crankshaft rigid with respect to any longitudinal thrust thereof through the main hubs 5 and 6 and yet provides a compact, even and balanced construction from which to transmit power.

Mounted on the countershaft 25 are gear wheels 38 and 39 adapted to have their teeth 40 mesh with the teeth on the pinions 35 and 36 respectively. I prefer to construct these gear wheels 38 and 39 with their hubs 41 bearing directly against the face of the journal bearings 21 and 25 on the frame 15, thereby affording a solid resistance to take up the thrust of the clutch wheels. These gear wheels 38 and 39 are constantly in mesh with the pinions on the crankshaft and therefore are continually rotating, turning freely on the countershaft 25 as a center and a bearing. This countershaft 25 is normally at rest and extends a sufficient length through the bearings 21 and 22 to receive pinions 44 and 45 respectively keyed thereon and with the teeth of said pinions constantly in mesh with the internal gears 34 carried by the tractor wheels 27 and 28. Consequently power is transmitted from the crank-shaft through the pinions thereon and the gear wheels 38 and 39 by clutching the countershaft 25 to the wheels 38 and 39, which crankshaft in turn, when thus connected, will rotate and move the pinions 44 and 45, thus turning the outer wheels 27 and 28.

In order to afford a suitable quick-acting and positive clutch which will furthermore have the feature of simultaneously clutching two rotating members, viz., the wheels 38 and 39, and by means which will act uniformly without torsion or twisting strains, I have devised my novel type of clutch. This comprises the clutch members 50 and 51, each having hubs 52, 52 mounted on and adapted to slide longitudinally of the countershaft 25. These clutch members have their respective outer faces 53, so formed or beveled as to cooperate with the correspondingly beveled inner faces 54, 54, of the gear wheels 38 and 39 so that sliding the clutch members longitudinally on the countershaft 25 outwardly or away from each other will act to clutch the countershaft to the gear wheels and reverse movement will act to unclutch the members. Each hub 52 of these clutch members is splined, as indicated at 55, in order to slide freely longitudinally of the countershaft 25, to impart rotation to said shaft when clutched to the rotating gear wheels. A channel 56 is also formed in each hub to permit effecting a longitudinal movement to withdraw the clutch members from contact with the gear wheels. A coiled spring 60 is positioned seating on a shoulder 61 on each hub and acting with expansive force on the hubs 52 to force the same apart and into clutching position on the wheels 38 and 39. In order to force these clutching members against tension of the spring 60 I provide a pair of levers 63, 63, pivoted to the frame at 64 (see Fig. 3) and having arms 65 carrying roller pins 66 which project into and register with the channel or groove 56 in each hub 52. These levers 63, 63, are inclined toward each other and are adapted to be separated by a wedge 70 pivotally supported on a fork 72, by a pin 73, said fork extending in a rod 75 through a bearing 76 in the rim portion of the frames 15. This rod extends within reach of the handle, whereby the operator can move the same longitudinally. On pulling the rod 75 outwardly, the wedge member 70 acts to force the curved ends of the two levers 63 outwardly, rocking the same on their fulcrums and moving the hubs 52 and clutch members 50 and 51 together simultaneously, disconnecting the clutch, and against the tension of the spring 60. Upon reverse movement of the rod 75, i. e., inwardly, the lever ends 63 are released and the spring 60 automatically acts to move both clutching members into engaging position, simultaneously seating the same, utilizing all the expansion of the spring in the work of holding both members into engagement, and necessarily exerting an absolutely uniform locking tension on both rotating wheels and countershaft. In this way a perfectly balanced driving transmission is secured from the countershaft to the tractor wheels and no undue strain, twists or other wearing influence is brought to bear upon the wheels, gears, countershaft or other moving parts. The driving strain is distributed equally among duplicate pairs of pinions, gears, clutches and keyways. The entire engine is balanced in weight, balanced in driving tension and in transmission. An efficient construction which is not apt to get out of order is also provided and while the entire mechanism is enclosed by the castings 12 and 15 in the side frames, all parts can be instantly rendered accessible by removing the upper half. To still further enclose the working parts and gear wheels, particularly those on the outer ends of the countershaft 25 and the inner gear teeth 34 on the tractor wheels, I prefer to supply a cover 80 on each wheel. This cover is preferably of metal and in annular form, being secured to the frame by a series of bolts 81, 81, and preferably with its outermost rim 82 turned inwardly and springing within a recess 83 in the rims 33. This prevents dust or dirt from getting into the working parts and completes the enclosure of all gears and wearing surfaces. In a tractor or cultivator it is most important to guard against dust and dirt as the working of the apparatus in plowing and cultivating fields necessarily stirs up a great deal of dust.

I prefer to extend the countershaft sufficiently beyond the hubs 5 and 6 to receive fly wheels 85 and 86, thus still further carrying out the balanced principle and construction of both weight and strains. If desired a pulley wheel can be used for one of these fly wheels when it is desired to operate the engine with the tractor stationary and employing the engine for other power purposes.

The rear frame 15 affords a convenient means for attaching the operating handles preferably two in number, 88 and 89, which extend rearwardly and may be bolted to the usual wooden handles 90. At the lower part of the frame 15 is also detachably secured a bracket 92 adapted to carry a crossbar 93 having a plurality of cultivator teeth 94, 95 or other agricultural implements.

It will be appreciated that my improved construction is of importance in enabling a tractor to be built light, compact, strong and yet simple, easily assembled and accessible, while also employing an arrangement and construction which will maintain a balanced relation throughout. Substantially all weights, bearings, gears, wheels and also the clutch mechanism are arranged in pairs and at points of equal distribution of wear and strain. My improved and novel type of simultaneously operating, double acting clutch, I believe to be novel and suitable for other uses, and I therefore wish to claim the same herein broadly.

My invention is further described and defined in the form of claims as follows:

1. A tractor of the kind described, comprising an internal combustion engine, a crank case affording spaced bearings for the crankshaft of said engine and concentric bearings for the tractor wheels, a pair of pinions on said crankshaft in spaced and balanced relation, gear wheels connected with said pinions and means to transmit power from said gear wheels to the tractor wheels through a double acting clutch.

2. A tractor of the kind described, comprising an internal combustion engine, a crank case affording spaced bearings for the crankshaft of said engine and concentric bearings for the tractor wheels, a pair of pinions on said crankshaft in spaced and balanced relation, gear wheels connected with said pinions and means to transmit power from said gear wheels to the tractor wheels through clutching means adapted to be connected simultaneously by an expansible spring.

3. A tractor of the kind described, comprising an internal combustion engine, a crank case affording spaced bearings for the crankshaft of said engine and concentric bearings for the tractor wheels, a pair of pinions on said crankshaft in spaced and balanced relation, gear wheels connected with said pinions and means to transmit power from said gear wheels to the tractor wheels through clutching means adapted to be connected simultaneously by an expansible spring, said spring and clutch members moving longitudinally of the axle for said gear wheels.

4. Tractor mechanism of the kind described, comprising a crankshaft, tractor wheels mounted concentric therewith, power transmission devices from the crankshaft to the tractor wheels arranged in pairs and in equal spaced relation relatively with the engine, means for connecting and disconnecting the power transmission devices and the tractor wheels at will whereby a double driving transmission is provided from the engine crankshaft to the tractors at spaced intervals and in balanced relationship of weight and power.

In testimony whereof, I have signed my name to this specification.

GEORGE W. GEILEAR.